United States Patent [19]

Lattin

[11] Patent Number: 4,489,790

[45] Date of Patent: Dec. 25, 1984

[54] SEED PLANTER PRESS WHEEL

[76] Inventor: Leonard Lattin, P.O. Box 447, Natalia, Tex. 78059

[21] Appl. No.: 450,077

[22] Filed: Dec. 15, 1982

[51] Int. Cl.³ .............................................. A01B 29/00
[52] U.S. Cl. .................................. 172/519; 172/538; 152/330 RF; 152/DIG. 5
[58] Field of Search ...................... 172/519, 538, 539; 152/DIG. 5, 330 RF, 323, 327, 325, 328

[56] References Cited

U.S. PATENT DOCUMENTS

| 2,648,369 | 8/1953 | Todd | 152/325 |
| 2,713,373 | 7/1955 | Daugherty | 172/519 X |
| 2,731,900 | 1/1956 | Oehler | 172/538 |
| 2,797,721 | 7/1957 | Hicks | 152/DIG. 5 |
| 2,848,278 | 8/1958 | Todd | 152/327 X |

FOREIGN PATENT DOCUMENTS

| 523566 | 4/1956 | Canada | 172/519 |
| 1038810 | 10/1958 | Fed. Rep. of Germany | 172/519 |

Primary Examiner—Richard J. Johnson
Attorney, Agent, or Firm—Cox & Smith, Incorporated

[57] ABSTRACT

The seed planter press wheel having a resilient tire means that is partially filled with an incompressible liquid so that the resilient tire means stretches upon contacting of the tire means with an earthen seed bed to inhibit the sticking of any caked mud on the outer surface of the resilient tire means.

6 Claims, 6 Drawing Figures

SEED PLANTER PRESS WHEEL

BACKGROUND OF THE INVENTION

This invention relates generally to seed planter press wheels of the type typically used on agricultural planters. More specifically the invention relates to seed planter press wheels which are self cleaning and inhibit the sticking of any caked mud on the outer surface of the press wheel.

The use of seed planter press wheels on planters is well known in the art. Typically the press wheels compact the soil over seeds deposited in the earth. The use of a press wheel which compacts the soil promotes the seed germination by retaining moisture in the soil and by maintaining the seed in close contact with the earth. Present planter press wheels compact and mold the seed bed to assist in good germination.

Because an adequate amount of moisture is necessary to promote germination, planting is best accomplished when adequate moisture is contained in the soil. However in such situations due to wetness of the soil and the sticky nature of the type of soil, the soil tends to cake up and pack on planter press wheels. There are times when it is desirable to plant seeds due to the favorable germination conditions and climate conditions although the soil conditions are such that caking and balling of the soil may prevent planting.

Over a period of many years, others have attempted to solve the problem of caking of mud on planter press wheels. An example of this is shown in U.S. Pat. No. 2,249,637 issued to E. L. Rietz which discloses a planter press wheel having annular tires. The tires are disclosed as being made of rubber which is flexible so that it will not accumulate soil and will be self-cleaning. Apparently, Reitz discloses a pressure tire since mention is made of an inner tube.

U.S. Pat. No. 2,691,335 issued to S. E. Murray also discloses a pneumatic planter press wheel. Murray discloses that the resilience of the tire will provide a self-cleaning action to remove soil tending to cling to it. Murray also discloses that the type of tire used makes it possible to support the planter over highways. The tire of Murray is filled with air greater than the atmospheric pressure which is disclosed as providing substantial flexing of the sidewalls, tread portions and inwardly converging walls in loose soil.

U.S. Pat. No. 2,698,566 issued to C. R. Stough discloses a wheel for receiving two hollow rubber tires. The tires are disclosed as having an air space and it is assumed that the tires would be flexible since they are made of rubber and include the air space.

U.S. Pat. No. 2,703,517 issued to J. M. Hooper discloses a pneumatic planter press wheel. Hooper discloses that in wet soil where the earth has a tendency to stick to the planter wheels the tire presents a smooth, highly flexible tread surface and flared sidewall surfaces to which the soil does not easily adhere. A valve stem 24 is provided in Hooper to supply air to the tire.

U.S. Pat. No. 2,731,900 issued to W. P. Oehler discloses a zero pressure rubber tired planter press wheel. Since the tire of Oehler is made of rubber, it is assumed that it would exhibit flexing upon contact with the earth.

U.S. Pat. No. 3,181,622 issued to C. B. Adams et al discloses a rubber planter press wheel having an outer tire member at zero pressure (atmospheric pressure). Adams et al discloses that the tire flexes thereby expelling any ground tending to cling to the tire surface. Adams et al also discloses that the degree of flexing is slight in comparison to other rubber tired press wheels thereby increasing the service life of the tire. Adams et al also discloses a planter press wheel having a resilient cover member which flexes to reduce adherence of soil.

U.S. Pat. No. 3,207,234 issued to W. R. Stewart discloses a planter press wheel which is of the zero pressure type. Stewart discloses that it has been known to provide a semi-pneumatic tire for a planter press wheel so that the tire would flex as the wheel rolled over the ground to break up moist soil and remove it from the peripheral surface of the tire.

As shown by the above prior art, numerous attempts have been made to solve the long standing problem of soil sticking to planter press wheels. Notwithstanding these attempts, the problem still exists whereby in certain conditions the soil will stick to the planter press wheel and prevent operation of the planter. There is a long felt need for a planter press wheel which can be used in adverse soil conditions whereby it is desirable to plant a crop. When the soil conditions prevent planting this may be costly in that delays are incurred involving shutdown time and which also may involve detrimental consequences later when the crop does not have a full growing season or is not planted at a time to take advantage of the optimum germination conditions and growing season.

It is an object of the invention to overcome the problems in the prior art by providing a planter press wheel which does highly inhibit the caking of soil thereon in adverse conditions which has not been satisfactorily achieved by the prior art press wheels. It is a further object of the invention to provide a planter press wheel which will properly compact the seed bed to facilitate germination while at the same time permit planting in adverse soil conditions without excess caking and balling up with mud. Further objects of the invention will become apparent from the following detailed disclosure.

SUMMARY OF THE INVENTION

The invention comprises a seed planter press wheel which inclues a wheel means rotatably mounted on a seed planter. A resilient tire means is mounted on the wheel means for contacting the earth in the seed bed to compact the soil above the seed bed. The resilient tire means is partially filled with an incompressible liquid so that the upper portion of the resilient tire means not in contact with the earthen seed bed is stretched a predetermined amount upon contacting the lower portion of the resilient tire mans with the earthen seed bed to release and inhibit the sticking of any caked mud on the outer surface of the resilient tire means. The resilient tire means extends outwardly past the wheel means at each side thereof to inhibit the sticking of any caked mud at the sides thereof.

BRIEF DESCRIPTION OF THE PREFERRED EMBODIMENT

Figure 1:
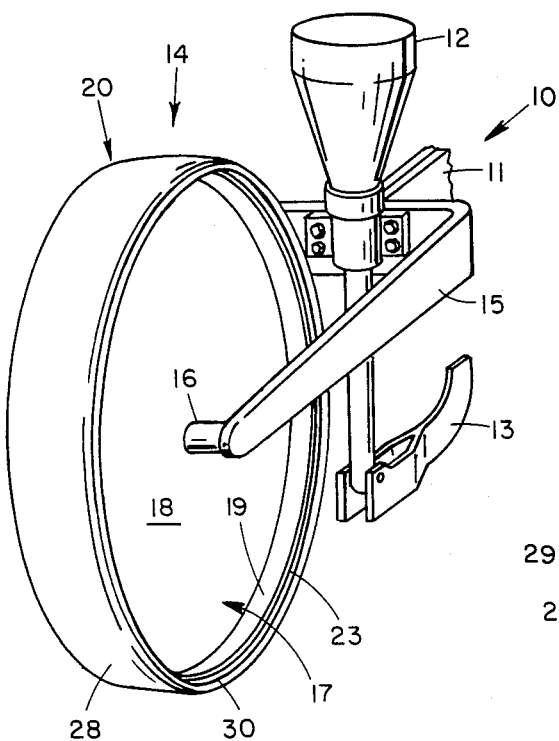
FIG. 1 is a perspective view showing a planter section with the press wheel mounted thereon.

Referring to FIG. 1 of the drawings, there is shown a planter unit 10. The planter unit 10 includes a beam member 11 which is secured to a planter as is well known in the art. The planter unit 10 includes a conventional seed dispensing mechanism 12 having a conventional furrow opener 13 as is also well known in the art. It is understood that the planter press wheel of the invention could be used on any type of planting mechanism which deposits the seed in the soil and requires a press wheel to compact the seed bed. The planter press wheel unit 14 is mounted upon one or more arms such as arm 15. An axle means 16 is provided to rotatably mount the planter press wheel unit on the one or more arms. Suitable bearings may be provided in the axle means 16 to rotatably mount the planter press wheel unit.

The planter press wheel unit 14 includes a wheel 17 which has a central supporting member 18. A rim 19 is mounted about the periphery of the central, cylindrical support member 18 for mounting the resilient tire 20 thereon.

Figure 2:
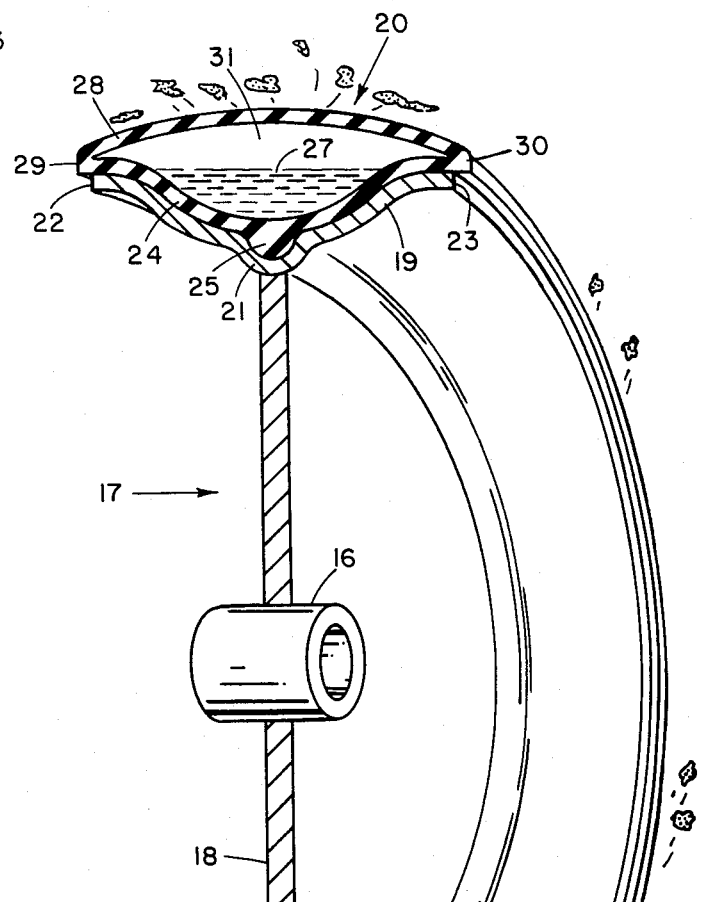
FIG. 2 is a partial cross sectional view in perspective showing the construction of the planter press wheel in its operation of inhibiting the sticking of caked soil.
Figure 3:
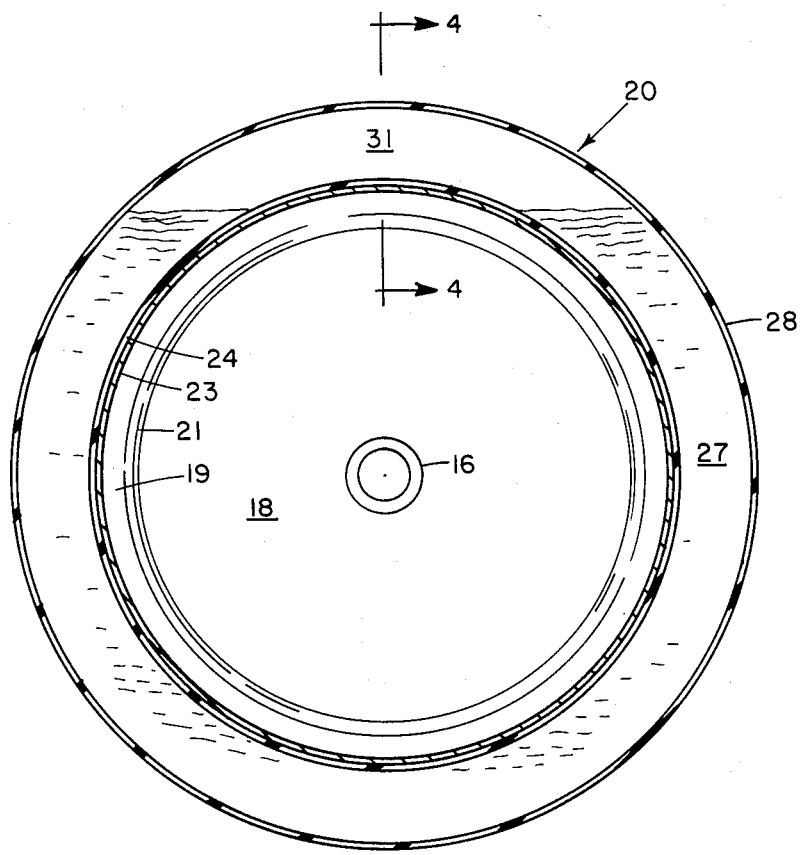
FIG. 3 is a cross sectional view of the planter press wheel showing the fluid within the resilient tire.
Figure 4:
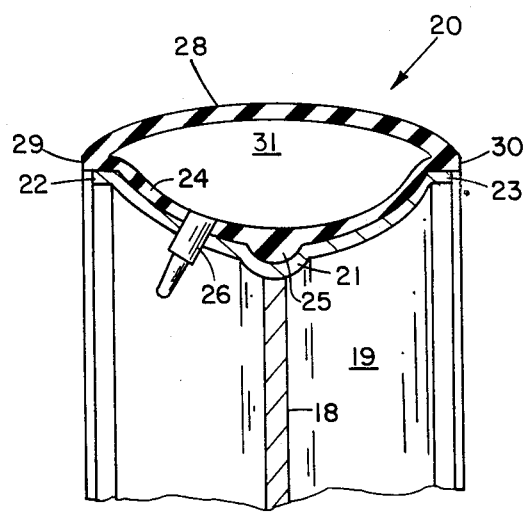
FIG. 4 is a cross sectional view taken along line 4—4 of FIG. 3.
Figure 6:
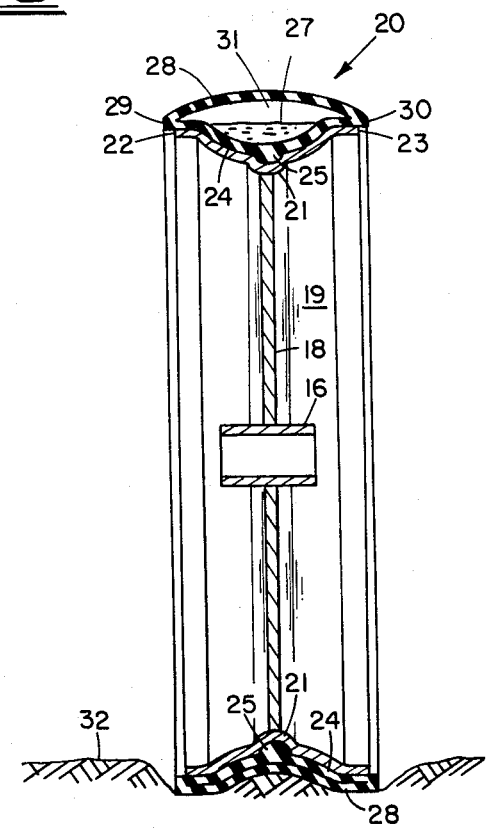
FIG. 6 is an end cross sectional view showing the planter press wheel contacting a seed bed.

The rim 19 has a shape as best shown in FIGS. 2, 4 and 6 which includes a recessed central portion 21 and outer edges 22 and 23. The rim 19 is generally concave in shape to receive the tire 20 and retain it on the wheel 17.

The tire 20 includes a first inner member 24 having a bead 25 which fits within the recessed central portion 21. The bead 25 and recessed central portion 21 retains the tire on the wheel 17 and prevents it from slipping sideways.

A valve stem 26 as shown in FIG. 4 is provided to inject an incompressible liquid such as liquid 27 within the tire 20. While the tire is shown as being tubeless, conventional tube construction could be used with a lip means at the outer edges 22 and 23 and a bead on the tire retained by said lip means. A conventional type tube could be used to retain air and an incompressible liquid.

The tire 20 includes a second outer member 28 which completes the tire. The outer member 28 and the inner member 24 are joined at the edges 29 and 30 to form a cavity for receiving and retaining the liquid 27. As will be apparent in FIGS. 2, 4 and 6, the edges 29 and 30 extend outwardly past the edges 22 and 23.

The tire 20 is made of a flexible rubber material which is resilient. The resiliency permits a predetermined stretching of the rubber material upon increasing the pressure of the liquid and air in the space 31 at the upper portion of the tire when the tire engages a seed bed as shown in FIGS. 2, 5, and 6.

Figure 5:
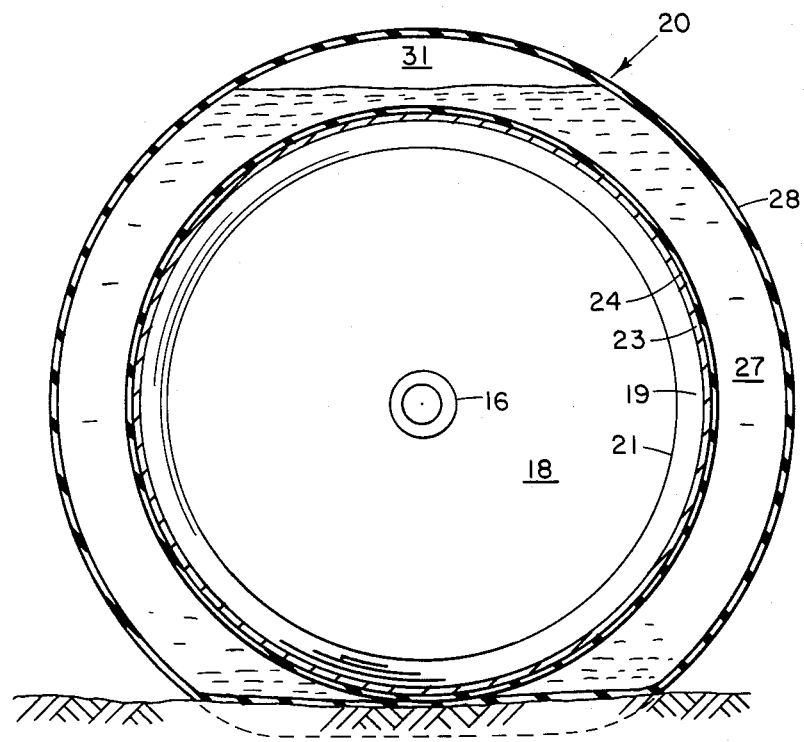
FIG. 5 is a cross sectional view showing the planter press wheel contacting an earthen seed bed.

The planter press wheel is shown in operation in FIGS. 2, 5, and 6. As will be apparent, upon contacting the seed bed 32 the outer member 28 will contact the inner member 24 to compact the seed bed 32. This causes the liquid or incompressible fluid 27 to be pushed upwardly. Since the space 31 contains a predetermined amount of air this air will be compressed greater than in a purely pneumatic tire since the liquid 27 is incompressible. This will result in a predetermined stretching of the outer member 28 to expel caked soil such as schematically shown in FIG. 2. The outer member 28 stretches since it is made of flexible rubber and since the cavity within the tire is filled with in the order of 75% incompressible liquid with the remainder being a compressible gas such as air. The amount of incompressible liquid can be varied to provide the desired amount of stretching and collapsing of the tire. As the tire 20 rotates the outer member 28 collapses as it engages the ground which also inhibits the build up of mud on the tire. It is understood that the cavity or space 31 is slightly above atmospheric pressure in the order of about 3 pounds psi. The amount of air pressure can also be varied to provide the desired amount of stretching and collapsing of the tire. It is contemplated that the incompressible fluid which is used would be water. However, it would be possible to use other incompressible fluids such as anti-freeze or the like. The insertion of an incompressible liquid in a tire is known in the art and is typically used to provide additional weight particularly with large tractor tires.

The continued collapsing of the outer member 28 at the bottom of the tire and the continued predetermined stretching of the outer member 28 at the upper portion of the tire provides the desired result of inhibiting the sticking of mud to the tire. The tire of the present invention can be used in adverse conditions when conventional planter press wheels, notwithstanding their so called anti-sticking characteristics, will cake with so much mud that they cannot be used for planting. The edges 29 and 30 of the tire extend outwardly past the edges 22 and 23 of the rib so that additional flexing results at this point. This is to further inhibit the sticking of mud at all points on the tire to permit continuing of planting in adverse soil conditions.

Although the invention has been described in conjunction with the foregoing specific embodiment, many alternatives, variations and modifications will be apparent to those of ordinary skill in the art. These alternatives, variations and modifications are intended to fall within the spirit and scope of the appended claims.

I claim:

1. A seed planter press wheel apparatus, comprising:
   a wheel means for rotatably mounting on a seed planter;
   a resilient tire means mounted on said wheel means for contacting an earthen seed bed;
   said resilient tire means being filled with predetermined volumes of incompressible liquid and compressible gas so that the upper portion of the resilient tire means stretches a predetermined amount upon contacting of the lower portion of the resilient tire means with the earthen seed bed to release and inhibit the sticking of any caked mud on the outer surface of the resilient tire means the ratio of said liquid and gas provide for the collapsing of the lower portion of the tire means upon contacting the seed bed.

2. The apparatus as set forth in claim 1, wherein:
   the resilient tire means extends outwardly past the wheel means at each side thereof to inhibit the sticking of any caked mud at the sides thereof.

3. The apparatus as set forth in claim 1, wherein:
   the compressible gas is slightly above atmospheric pressure.

4. The apparatus as set forth in claim 1, wherein:
   the resilient tire means comprises a first portion contacting the wheel means and a second portion joined with the first portion to form a cavity for receiving said liquid and gas.

5. The apparatus as set forth in claim 4, wherein:
the first portion includes a retaining means to keep the tire means on the wheel means.

6. A seed planter press wheel apparatus, comprising:
a wheel means for rotatably mounting on a seed planter;
a resilient tire means mounted on said wheel means for contacting an earthen seed bed; said resilient tire means having a first portion contacting the wheel means and a second portion joined with the first portion to form a cavity for receiving predetermined volumes of an incompressible liquid and compressible gas;
said first portion including a retaining means to keep the tire means on the wheel means;
said resilient tire means extending outwardly past the wheel means at each side thereof to inhibit the sticking of any caked mud at the sides thereof;
said resilient tire means being filled with said predetermined volumes of incompressible liquid and compressible gas so that the upper portion of the tire means stretches a predetermined amount upon contacting of the lower portion of the resilient tire means with the earthen seed bed to release and inhibit the sticking of any caked mud on the outer surface of the resilient tire means; and
the ratios of said liquid and gas providing for the collapsing of the lower portion of the tire means upon contacting the seed bed.

* * * * *